United States Patent
Goldstein et al.

(10) Patent No.: US 12,127,570 B2
(45) Date of Patent: Oct. 29, 2024

(54) RECONSTITUTED SOLUBLE TAPIOCA FLOUR

(71) Applicant: Cargill, Incorporated, Wayzata, MN (US)

(72) Inventors: Avi Goldstein, Golden Valley, MN (US); Xian-Zhong Han, Maple Grove, MN (US); Thomas Kennedy Hutton, Minneapolis, MN (US)

(73) Assignee: Cargill, Incorporated, Wayzata, MN (US)

( * ) Notice: Subject to any disclaimer, the term of this patent is extended or adjusted under 35 U.S.C. 154(b) by 0 days.

(21) Appl. No.: 17/757,862

(22) PCT Filed: Dec. 22, 2020

(86) PCT No.: PCT/US2020/066617
§ 371 (c)(1),
(2) Date: Jun. 22, 2022

(87) PCT Pub. No.: WO2021/133805
PCT Pub. Date: Jul. 1, 2021

(65) Prior Publication Data
US 2023/0058533 A1     Feb. 23, 2023

(51) Int. Cl.
*A23L 19/10* (2016.01)

(52) U.S. Cl.
CPC ..................... *A23L 19/11* (2016.08)

(58) Field of Classification Search
CPC ........ A23L 29/212; A23L 33/21; A23L 19/11; A23L 2/39; A21D 13/06; A21D 2/186; A21D 2/36; A21D 13/066; A21D 13/043; A21D 10/005; A21D 2/366
See application file for complete search history.

(56) References Cited

U.S. PATENT DOCUMENTS

| | | | | |
|---|---|---|---|---|
| 2,987,424 | A | * 6/1961 | Olnick | C08B 30/04 127/65 |
| 4,865,863 | A | * 9/1989 | Prosise | A23L 13/426 426/555 |
| 4,923,709 | A | 5/1990 | Slimak | |
| 5,350,593 | A | 9/1994 | Lacourse | |
| 2012/0070559 | A1 * | 3/2012 | Foss | A21D 13/045 426/550 |
| 2014/0193564 | A1 | 7/2014 | Carder | |
| 2018/0268997 | A1 | 9/2018 | Koga | |

FOREIGN PATENT DOCUMENTS

| | | |
|---|---|---|
| CN | 1287564 A | 3/2001 |
| CN | 1912144 A | 2/2007 |
| CN | 101396102 A | 4/2009 |
| CN | 102286570 A | 12/2011 |
| CN | 103039904 A | 4/2013 |
| CN | 112969372 A | 6/2021 |
| JP | 2001321108 A | 11/2001 |
| WO | 9428741 A1 | 12/1994 |
| WO | 2020006030 W | 1/2020 |

* cited by examiner

*Primary Examiner* — Hong T Yoo

(57) ABSTRACT

Described herein are reconstituted soluble tapioca flour compositions having desirable chemical properties and solubility and viscosity functionality for use in food products such as, beverage mix, infant food, a medicinal product, an emulsion, convenience foods, or a snack-based filling. Such compositions can be used as a partial or complete replacement of maltodextrin and offer a more clean-label alternative.

10 Claims, 5 Drawing Sheets

RECONSTITUTED SOLUBLE TAPIOCA FLOUR

CROSS REFERENCE TO RELATED APPLICATIONS

This application is a national phase application of PCT/US2020/066617, filed 22 Dec. 2020, entitled RECONSTITUTED SOLUBLE TAPIOCA FLOUR which claims the benefit of U.S. Provisional Patent Application No. 62/952,827, filed 23 Dec. 2019, entitled RECONSTITUTED SOLUBLE TAPIOCA FLOUR which are hereby incorporated by reference in their entirety.

TECHNICAL FIELD

This application relates to soluble flour compositions and methods of manufacturing the same.

BACKGROUND

Consumers are asking for label friendly alternatives to maltodextrin in food and beverage applications. While there is a desire to create label-friendly alternatives, there is also a desire for such alternatives to have similar functionality as that of maltodextrin.

SUMMARY

Described herein are reconstituted soluble tapioca flour compositions having desirable chemical properties and solubility and viscosity functionality for use in food products such as, beverage mix, infant food, a medicinal product, an emulsion, convenience foods, or a snack-based filling. Such compositions can be used as a partial or complete replacement of maltodextrin and offer a more clean-label alternative.

FIGURES

Figure 1:
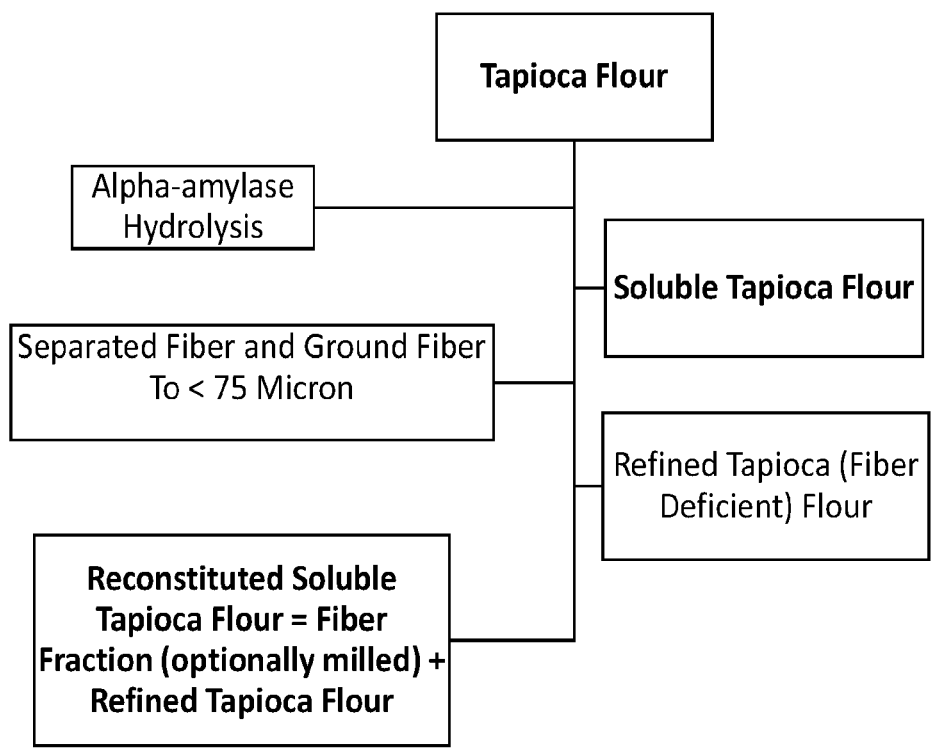

FIG. 1 provides an illustration of the manufacturing process to achieve the reconstituted soluble tapioca flour compositions described herein.

Figure 2:
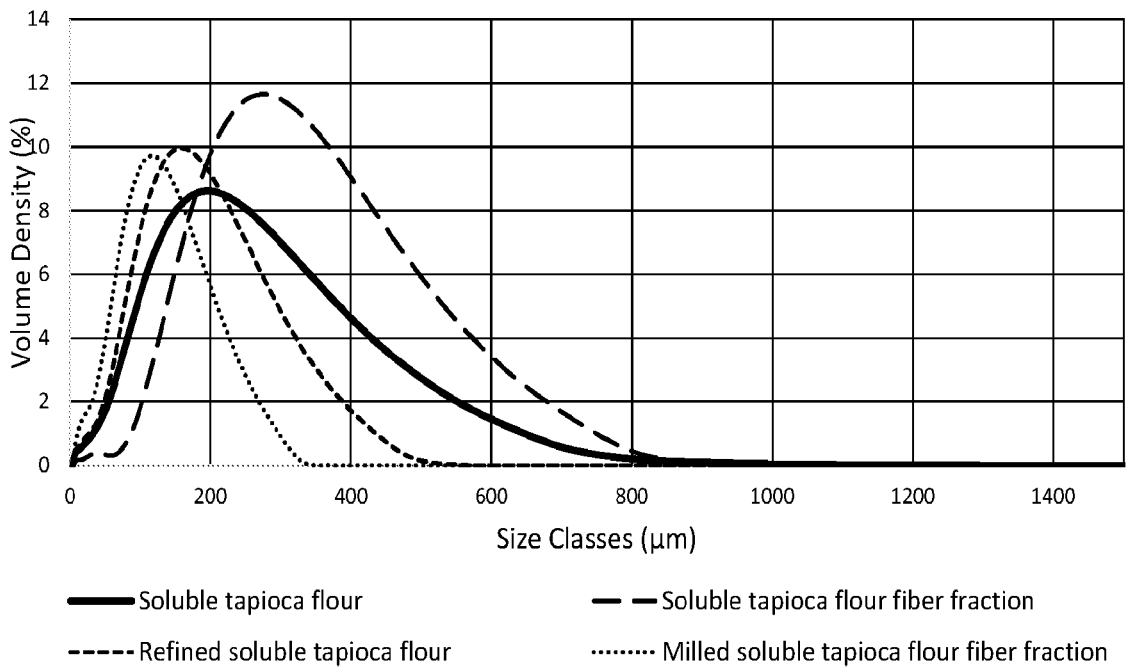

FIG. 2 shows the particle size distribution of the soluble tapioca flour and it fractions described herein.

Figure 3:
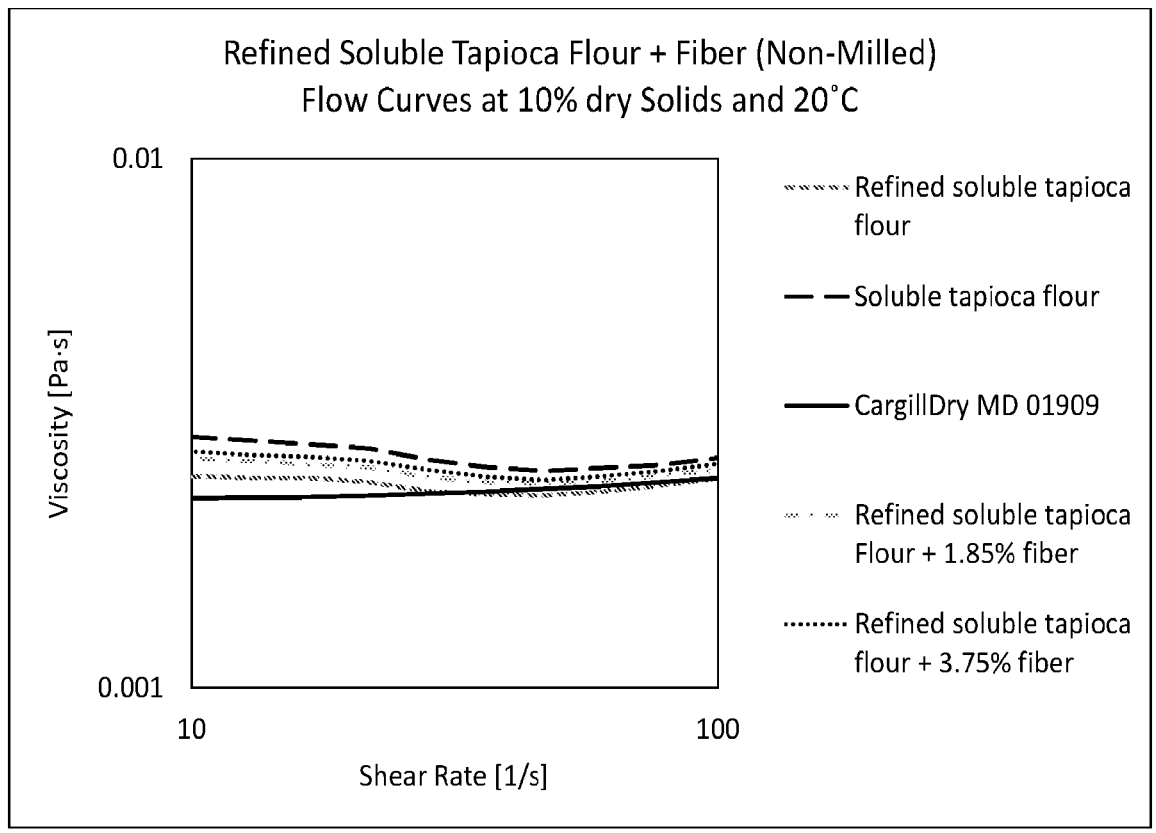
Figure 4:
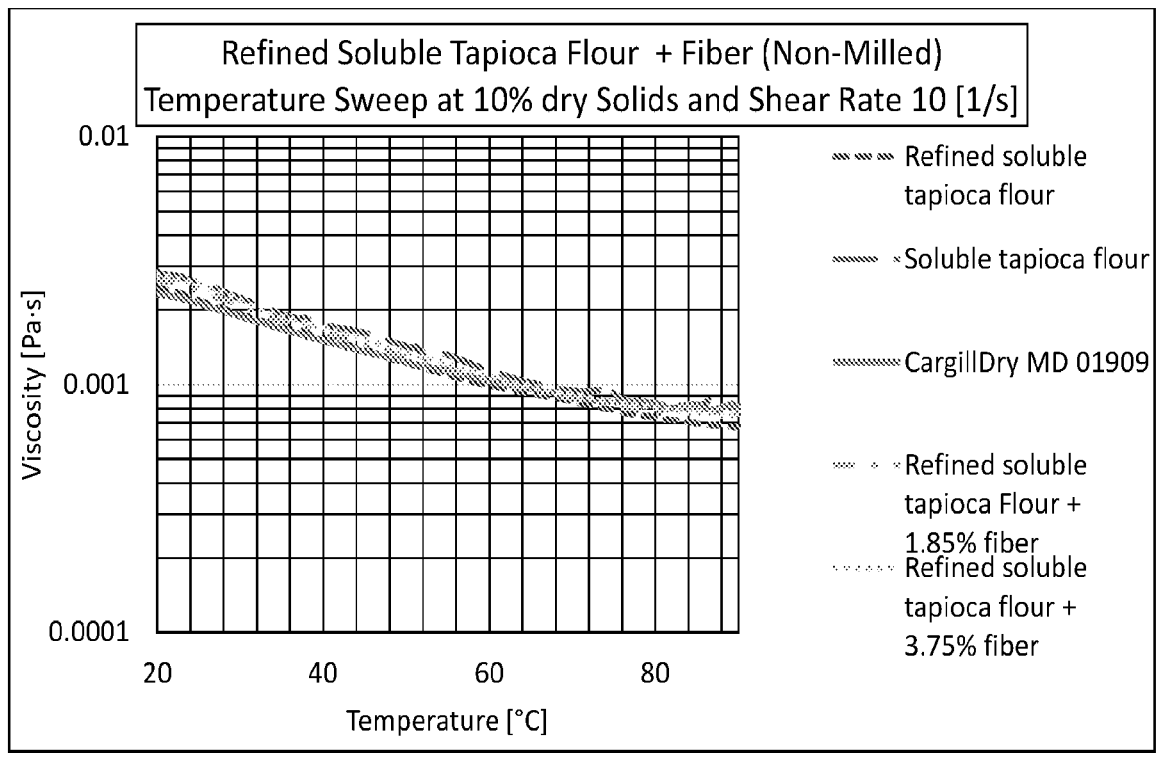

FIGS. 3 and 4 provide viscosity curves of reconstituted soluble tapioca flour (fiber fraction) at a given shear rate and temperature, respectively, compared to maltodextrin.

Figure 5:
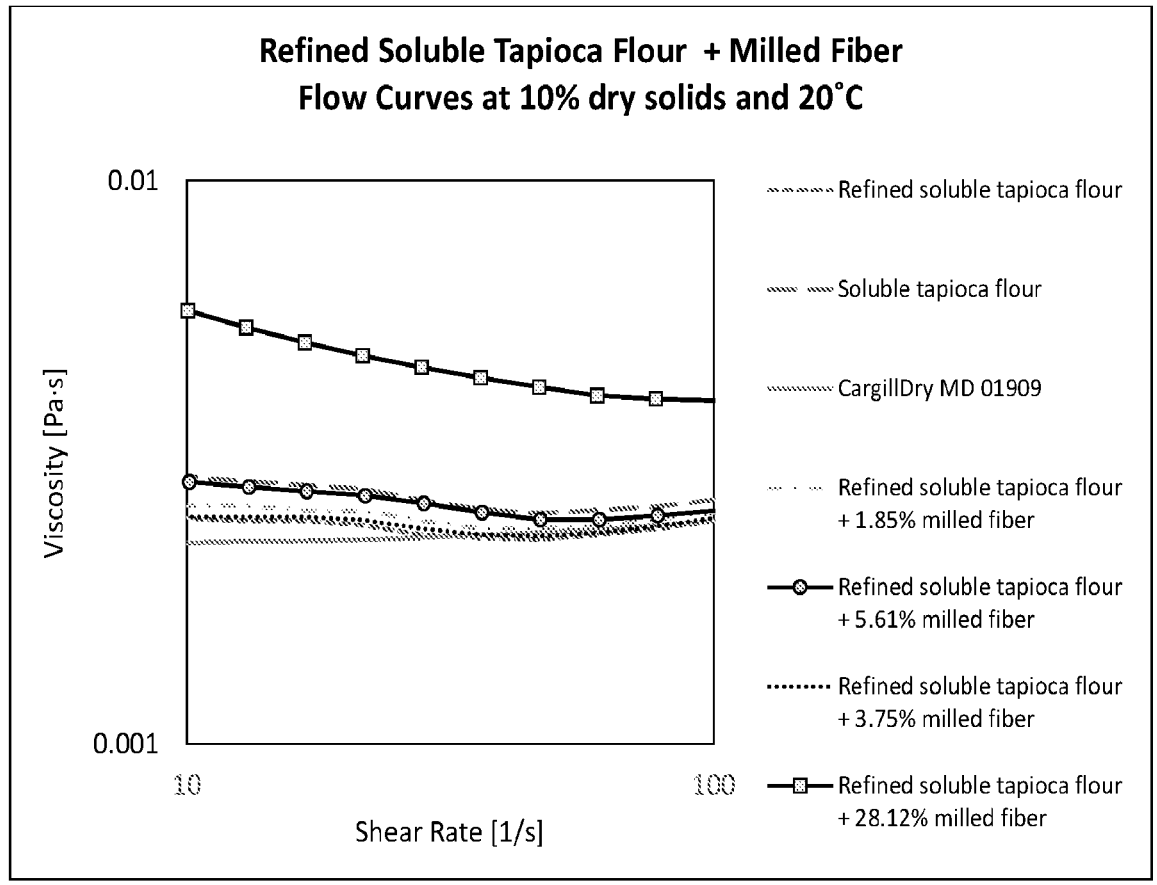
Figure 6:
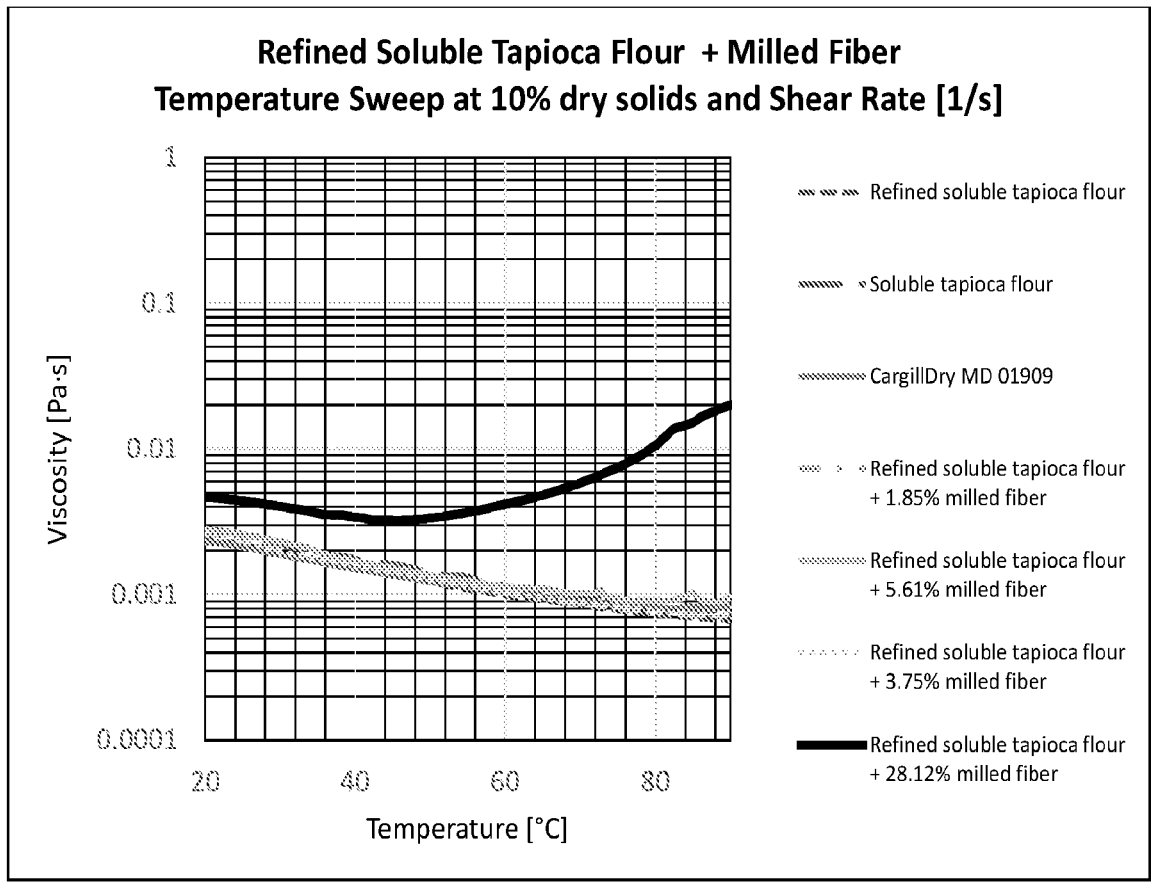

FIGS. 5 and 6 provide viscosity curves of reconstituted soluble tapioca flour (fiber fraction, milled) at a given shear rate and temperature, respectively, compared to maltodextrin.

DETAILED DESCRIPTION

Described herein is a reconstituted soluble tapioca flour composition and a method of manufacturing the same. Such reconstituted soluble tapioca flour can be used in food and beverage applications as a maltodextrin replacement. It shall be understood that tapioca flour may also be referred to herein as cassava flour, and that such difference in terms is based on geographical and market differences. Cassava flour sold commercially typically contains fiber contents (both soluble and insoluble fiber) in the range of 2.0-10 grams fiber per 100 grams of flour, whereas tapioca flour sold commercially may be more refined, and may contain lower amounts of fiber than the previously mentioned cassava flour.

In this application, reference to cassava or tapioca flour refers to milled flours containing greater than 2 grams of fiber per 100 grams flour.

As used herein, the term "soluble tapioca flour" can be referred to as hydrolyzed, enzymatically treated, enzymatically-modified, and/or solubilized tapioca flour. Such soluble tapioca flour has been treated to promote greater solubility of their principle components in liquids such as water. Further, such soluble flour demonstrates similar functionality as that of maltodextrin, has a desirable "clean flavor", mouthfeel, and texture suitable for food and beverage applications. The skilled person knows how to manufacture a soluble tapioca flour, e.g. from U.S. Pat. No. 5,350,593 and US20186268997, the disclosures of which are incorporated herein by reference.

As used herein, the term "soluble" is referencing solubility of flour components in water.

As used herein, the term "flour" encompasses (1) non-grain flours and (2) fractionated, non-whole grain flours wherein a portion of bran and germ have been removed.

Described herein is a reconstituted soluble tapioca flour created by first treating native tapioca flour with an enzyme to obtain a soluble tapioca flour. Native tapioca flour is flour obtained by milling the tuberous roots of the tapioca plant, which is a member of the Euphorbiaceae or spurge family, manihot genus. The enzyme is preferably an alpha-amylase enzyme, however other bacterial or fungal enzymes may also be used, for example but not limited to iso-, gluco-, beta-, pullulanase, and/or alpha enzymes, and/or combinations thereof. In preferred aspects, the alpha-amylase is a thermal stable alpha-amylase.

The soluble tapioca flour contains a fiber component. The fiber component contains soluble fibers and non-soluble fibers.

The soluble tapioca flour is further refined by separating out the fiber component therefrom to form (i) a fiber rich fraction (also referred to as the fiber fraction) and (ii) a refined soluble tapioca flour. The refined soluble tapioca flour typically contains up to 3 wt % soluble fiber and up to 5 wt % insoluble fiber]. Preferably, at least 1 wt % fiber fraction is separated out of the soluble tapioca flour, more preferably at least 3 wt %, most preferably at least 5 wt %. Well known separation techniques can be used, non-limiting examples include sieving, (wet) vacuum filtration and other known techniques.

The fiber fraction optionally can be further milled using standard milling techniques known in the art. The fiber fraction (also referred to as "unground") or the milled (also referred to as "ground") fiber fraction can then be recombined with the refined soluble tapioca flour to obtain the reconstituted soluble tapioca flour described herein. A reconstituted soluble tapioca flour is therefore understood as flour which was first separated into two components: (i) a fiber fraction and (ii) a refined soluble tapioca flour and secondly reconstituted by mixing the two separated components with each other. Before reconstituting the flour, the two components can be processed, e.g. by milling.

FIG. 1 provides an illustration of the manufacturing process to achieve the soluble tapioca flour compositions described herein.

Preferably, the soluble tapioca flour contains a fiber fraction in an amount of at least 2 wt %, more preferably at least 3 wt %, most preferably at least 5 wt %, relative to the weight of the flour.

Preferably, the amount of soluble fiber in the soluble tapioca flour is at least 10 wt % in the fiber fraction, more preferably at least 20 wt %, most preferably at least 30 wt %. Preferably, the soluble fiber is in an amount of at most 70 wt %, more preferably at most 65 wt %, most preferably at most 60 wt %.

Preferably, the amount of insoluble fiber in the soluble tapioca flour is at least 30 wt % in the fiber fraction, more preferably at least 35 wt %, most preferably at least 40 wt %. Preferably, the insoluble fiber is in an amount of at most 90 wt %, more preferably at most 80 wt %, most preferably at most 70 wt %.

Preferably, the soluble tapioca flour contains a fiber fraction in an amount of at least 1 wt %, the fiber fraction containing between 10 wt % and 70 wt % soluble fiber and between 30 wt % and 90 wt % insoluble fiber. Preferred amounts for the fiber fraction, soluble fiber and insoluble fiber are given hereinabove and will not be repeated herein.

The reconstituted soluble tapioca flour preferably comprises greater than 90 wt % and in some aspects greater than 95 wt %, but less than 100%, refined soluble flour with the remaining balance being the fiber fraction (which can be optionally milled).

The dextrose equivalent ("DE") of the reconstituted soluble tapioca flour compositions described herein ranges preferably from 5 to 18 and more preferably from 8 to 15. Such compositions are distinguishable from native flour, which have a different DE, and have significantly improved solubility and viscosity functionality for certain food applications.

The reconstituted soluble tapioca flour described herein is substantially soluble and has improved solubility over native tapioca flour starting material. Without being bound by any theory, it is believed that the enzyme treatments and reconstitution step further improves solubility.

Preferably, the reconstituted soluble tapioca flour has a solubility of at least 5 wt %, more preferably at least 7 wt %, most preferably at least 9 wt %. Solubility is measured by particle size distribution and based on the wet/dispersed solubility in 90 C water.

The refined soluble tapioca flour preferably comprises a particle size distribution wherein 90% of particles (D90) have a size of 300 microns or less, 50% of particles (D50) have a particle size of 150 microns or less, and 10% of particles (D10) have a size of 50 microns or less. Preferably, D90 is at most 280 microns, more preferably at most 260 microns. Preferably, D50 is at most 140 microns, more preferably at most 130 microns. Preferably D10 is at most 45 microns, more preferably at most 40 microns. Preferably D90 is between 160 and 300 microns. Preferably D50 is between 60 and 150 microns. Preferably D10 is between 10 and 50 microns.

The milled fiber fraction preferably comprises a particle size distribution wherein 90% of particles have a size of 200 microns or less, 50% of particles have a particle size of 100 microns or less, and 10% of particles have a size of 50 microns or less. Preferably, D90 is at most 180 microns, more preferably at most 160 microns. Preferably, D50 is at most 90 microns, more preferably at most 80 microns. Preferably D10 is at most 45 microns, more preferably at most 40 microns. Preferably D90 is between 110 and 200 microns. Preferably D50 is between 60 and 100 microns. Preferably D10 is between 10 and 50 microns.

Furthermore, when the soluble tapioca flour was reconstituted using at least one milled component, the reconstituted flour might have desirable viscosity functionality similar to that of maltodextrin.

The reconstituted soluble tapioca flour as described herein is desirable for use in food applications. Notable food applications include but are not limited to beverages, beverage mixes, infant food, medicinal products, food emulsions, convenience foods, salad dressings bakery, dairy, and snack-based fillings or food products (including frozen meals). Beverages and beverage mixes can include instant mixes for hot or cold beverages, flavored milk including chocolate milk, carbonated soft drinks, fruit juices, sports beverages, nutrition beverages, and infant formula. Dairy can include ice cream, yogurt, sour cream, whip cream, and non-dairy vegan alternatives. Convenience foods include but are not limited to salad dressings (pourable and spoonable), sauces (instant and prepared), condiments, puddings, bars, cereals, coatings for cereal, spreads, low-fat spreads, icings, hard candies, soft candies, gummy products, and dry mix seasonings. Bakery can include cookies, cakes, muffins, crackers, pastries, and laminated baked products.

The reconstituted soluble tapioca flour as described herein can be used as at least a partial replacement of maltodextrin in food applications and in many cases can be used as a full replacement of maltodextrin in food applications. Such reconstituted soluble tapioca flour can be an effective maltodextrin replacement in any food application in which maltodextrins are currently used. The reconstituted soluble tapioca flour demonstrates similar functionality (e.g., pH, solubility, and viscosity) as maltodextrin making it a suitable replacement for maltodextrin in food applications. Such replacement allows for consumer-friendly labeling as soluble flours may be more well received by some consumers as compared to maltodextrin.

Further, such soluble tapioca flour additionally has the capability to replace maltodextrins in flavor encapsulation applications wherein a flavor emulsion is created and spray dried, to convert a liquid flavor into a solid. In these applications maltodextrins may be used alongside a lipophilic starch, or alternately used alone to create a flavor emulsion. Maltodextrins are typically used in this space due to their ability to form matrices that positively contribute to encapsulation. The soluble tapioca flour described herein can replace maltodextrins in this space due to their bland flavor, low viscosity, and low cost. Additionally, reconstituted soluble tapioca flours can replace maltodextrin in plating oil-based flavors.

In preferred aspects, the reconstituted soluble tapioca flour as described herein can be used for instant sauces (e.g., dry mix that is reconstituted to a sauce formed by the consumer), prepared sauces, dry mix seasoning, and flavor encapsulation. Such reconstituted soluble tapioca flours can be added in varying amounts and consistently demonstrate similar taste and functionality as maltodextrin.

EXAMPLES

Example #1: Method of Making Soluble Tapioca Flour

In a mixing tank, a 25% (w/w) aqueous flour slurry was prepared using King Lion cassava flour (King Lion Premium Cassava flour, American Key Food Products LLC, NJ, USA). A quantity of 24 kg water was added in the mixing tank first, and then mixing was started at slow speed (slow enough to avoid splashing). The 8 kg as-is tapioca flour was added slowly to the mixing tank while contents were mixed continuously at the slow speed. The slurry was maintained at ambient temperature (about 22° C.). The speed of mixing was adjusted to prevent settling of flour solids.

The pH and the temperature of the slurry in feed tank were adjusted to a pH to 4.8-5.2 using 7% HCl and a temperature of about 22° C. After pH adjustment, the mixing of the slurry was continued at a gentle speed. A quantity of 6.8 g GC 127 (0.085% flour wt. basis) enzyme from DuPont (thermostable alpha-amylase enzyme) was weighted in a clean plastic container and added to the slurry.

Using water as the feed for the jet cooker, the jet cooker was equilibrated at a cooking temperature between 270° F. (132° C.) and an outlet temperature of 203° F. (95° C.) (atmospheric flash in product tank). Once the cooking conditions were set, the feeding of the tapioca flour slurry into the jet cooker commenced. The liquefact product exiting the jet cooker was collected into a product tank which was equipped with an overhead mixer and temperature controlled up to 95° C. After the first jet-cooking, it was preferred to pass the jet cooked slurry through the jet cooker a second time, followed by an addition of 0.817 g GC 127 (0.01% flour wt. basis) enzyme dosing.

The liquefact was held in the product tank at 95° C. for a desired holding time (~30 min to 1 hour depending on DE measured using Iodine-KI color method).), while continuously mixing the liquefact at a slow speed to avoid splashing of hot liquid. After completion of desired holding times, the pH was adjusted to 2.7-3.0 at 95° C. and the liquefact was held at the set pH for 15 minutes. The mixing the liquefacts continued at a slow speed to avoid splashing of hot liquid. To ensure complete inactivation of enzyme, the temperature was accurately controlled and the holding time was set to 15 minutes.

After completion of enzyme kill step, the heating was turned off by adjusting the steam valve and the slurry cooled down to 80° C. (use cooling water circulation if needed). The mixing of liquefacts continued at a slow speed to avoid splashing of hot liquid. The pH was adjusted to 4.45 in liquefacts using NaOH base buffer. A liquefact containing the soluble tapioca flour was obtained, which was spray dried to obtain the soluble tapioca flour. The soluble tapioca flour was further refined by separating out the coarse fibers and particulates present using a US sieve having 106 micron pore size. As described in Table 1, the coarse fiber fraction makes up about 5% of the soluble tapioca flour before refining.

TABLE 1

| Fraction of Soluble Tapioca Flour | Amount (g) | Percent of total |
|---|---|---|
| Fiber Fraction >106μ | 86.7 | 5.18% |
| Refined Soluble Tapioca Flour <106μ | 1588.5 | 94.82% |
| Total | 1675.2 | 100.00% |

The fiber fraction (soluble tapioca flour fiber fraction) may then be further milled using conventional equipment for such purposes, for example a coffee grinder, to produce finer particles that passed through a 75 micron sieve (milled soluble tapioca flour fiber fraction).

FIG. 1 provides a general illustration of this process. Table 2 provides the chemical composition of the soluble tapioca flour, soluble tapioca flour fiber fraction, and refined soluble tapioca flour (with fiber fraction removed). It shall be understood that the fiber fraction and refined tapioca flour can also be obtained via wet filtration (or other wet, dry, or air filtration techniques), hence that data is also provided in Table 2. To conduct wet filtration, 1000 grams of liquefact can be taken after the enzyme kill step and pH adjustment prior to spray drying. A 700 gram portion of may be filtered using Whatman #4 filter paper and a Buchner funnel. The filtrate may then be freeze dried, while the retentate may be dried in a forced air oven overnight at 40° C.

Such fiber fraction or milled fiber fraction can then be reintroduced into the refined soluble tapioca in varying amounts, this combination of fiber fraction or milled fiber fraction and refined tapioca flour makes up the reconstituted soluble tapioca flour described herein.

Example #2: Solubility and Particle Size Distribution

Large/coarse particles present in flour may contribute to a gritty mouthfeel which is not desirable in many food products. Additionally, these large particles may additionally swell when dispersed in water, which may influence the viscosity of the system they are dispersed in. Therefore, to improve the mouthfeel and viscosity of soluble tapioca flour, the fiber fraction and/or the refined soluble tapioca flour may be further milled and recombined to for the reconstituted soluble tapioca flour. The reconstituted soluble tapioca flour described herein is desirable for use in food products, particularly culinary and convenience applications as its components demonstrate good solubility functionality. Particle size distribution analysis was carried out using a Malvern Mastersizer 3000 Laser Light Diffraction Particle Size Analyzer. The particle size of material is determined by laser diffraction, which measures particle size distributions determined by angular variation in intensity of light scattered as a laser beam passes through a dispersed particulate sample. This dispersed particulate sample is a slurry in water. Dx (10), (50) and (90) means 10%, 50% and 90% of the population lies below the diameters of D10, D50 and D90 respectively. D[4,3] is volume weighted mean. In sample preparation, 10 ml of 1% solution of maltodextrin or soluble flour was prepared. Sample was added to the Hydro LV cell dropwise until the obscuration reached at least 1% to start measurement. If the 1% 10 ml solution was added and the obscuration was still less than 1%, the particle sizes were considered to be zero.

Table 3 and FIG. 2 shows the particle size distribution of the soluble tapioca flour, the fiber fraction, the refined soluble flour, and the milled fiber fraction. Notably, the refined soluble fiber has improved, smaller particle size and grinding the fiber fraction also improves particle size properties. It shall be understood that this particle size analysis is conducted after solubilization in 90° C. water.

TABLE 2

| Sample Name | Dx (10) (μm) | Dx (50) (μm) | Dx (90) (μm) | D [4,3] (μm) | Mode (μm) |
|---|---|---|---|---|---|
| Soluble Tapioca flour | 50 | 172 | 390 | 201 | 196 |
| Soluble Tapioca Flour Fiber Fraction >106 um | 127 | 262 | 489 | 286 | 275 |
| Refined Soluble Tapioca Flour <106 um | 43.3 | 138 | 269 | 150 | 158 |
| Milled Tapioca Flour Fiber Fraction <75 um | 22.4 | 95.9 | 193 | 103 | 117 |

Example #3: Viscosity

The reconstituted soluble tapioca flour described herein is desirable for use in food products because it demonstrates good viscosity functionality. FIGS. 3 through 6 provide viscosity curves at a given shear rate and temperature, respectively, compared to maltodextrin. The figures demonstrate reconstituted soluble tapioca flour with varying amounts of fiber fraction and milled fiber fraction in varying amounts. Notably, such reconstituted soluble tapioca flour performs similarly to maltodextrin.

Example #5: Salad Dressing Sensory Analysis

Water was combined with the dry ingredients containing Cargill Dry MD 01909 maltodextrin or the various soluble tapioca flours (a one to one replacement of maltodextrin) and mixed in a Cuisinart food processor for approximately 3 minutes—see Table 4 for the overall salad dressing formulation. The oil was slowly added to the mixer and mixed for approximately 5 minutes. Vinegar was then added and mixed for approximately 1 minute.

TABLE 4

| Control (Reduced Fat, 17.5% Oil) | | |
|---|---|---|
| INGREDIENT | % | GRAMS |
| Water | 48.98 | 146.94 |
| Vegetable Oil | 17.5 | 52.5 |
| Cargill Dry MD 01909 (10 DE) | 16.7 | 50.1 |

TABLE 4-continued

| Control (Reduced Fat, 17.5% Oil) | | |
|---|---|---|
| INGREDIENT | % | GRAMS |
| Vinegar | 7 | 21 |
| Sugar | 3 | 9 |
| Salt | 1.7 | 5.1 |
| Egg Yolk Powder | 1.5 | 4.5 |
| HiForm Starch 12754 | 2.8 | 8.4 |
| Ground Mustard | 0.5 | 1.5 |
| Potassium Sorbate | 0.12 | 0.36 |
| Xanthan gum | 0.2 | 0.6 |
| Total | 100 | 300 |

Bostwick measurements were then measured and described in Table 5. Measurements were completed utilizing Bostwick Consistometer (CSC Scientific Company, Inc., Fairfax, Virginia, USA) with a sample loading weight of 100 grams, and a measurement window of 15 seconds. Viscosity was also measured using a Brookfield Rheometer fitted with spindle 64 measured at 20 rpm. Bostwick and viscosity data demonstrates that the reconstituted soluble tapioca flour described herein is a suitable replacement for maltodextrin.

TABLE 5

| Dressing Viscosities | Initial Brookfield, Spindle 64, 20 RPM (cp) | 24 hours after initial production Brookfield, Spindle 64, 20 RPM (cp) | Bostwick (15 seconds)- Initial | Bostwick (15 seconds)- 24 hours |
|---|---|---|---|---|
| Control (Reduced Fat, 17.5% Oil) | 10948 | 18167 | 7.0 | 5.5 |
| 98.15% Refined Soluble Tapioca Flour, 1.8% Soluble Tapioca Flour Fiber Fraction | 14774 | 27080 | 6.0 | 4.0 |
| 96.25% Refined Soluble Tapioca Flour, 3.75% Soluble Tapioca Flour Fiber Fraction | 15070 | 24990 | 6.5 | 3.5 |
| 98.15% Refined Soluble Tapioca Flour, 1.8% Milled Soluble Tapioca Flour Fiber Fraction | 16136 | 25541 | 5.0 | 3.5 |
| 96.25% Refined Soluble Tapioca Flour, 3.75% Milled Soluble Tapioca Flour Fiber Fraction | 15507 | 27263 | 6.0 | 4.0 |
| 94.39% Refined Soluble Tapioca Flour, 5.61% Milled Soluble Tapioca Flour Fiber Fraction | 16046 | 25497 | 5.5 | 4.5 |
| 71.88% Refined Soluble Tapioca Flour, 28.12% Milled Soluble Tapioca Flour Fiber Fraction | 24303 | 40157 | 3.5 | 2.5 |

Professional sensory analysis was also carried out. Each panelist was served about 2 oz of sample in 2 oz serving cups. Panelists were instructed to cleanse their palate with water in between samples. Comparison questionnaires aimed at comparing characteristics and attributes of the test samples compared to salad dressings containing control 10 DE maltodextrin were completed. Mean comparison score were calculated, and are presented in Table 6, again showing reconstituted soluble tapioca flour is a suitable replacement for maltodextrin.

Aspect 5 provides the composition of Aspect 4, wherein the milled fiber fraction has a particle size distribution wherein 90% of particles have a size of 200 microns or less and 50% of particles have a particle size of 100 microns or less.

Aspect 6 provides the composition of Aspect 5, further comprising the milled fiber fraction having a particle size distribution wherein 10% of particles have a size of 50 microns or less.

Aspect 7 provides the composition of Aspect 1, wherein the refined soluble tapioca flour has a particle size distribution wherein 90% of particles have a size of 300 microns or less and 50% of particles have a particle size of 150 microns or less.

TABLE 6

| Characteristics & Attributes | Control (Maltodextrin) | 98.15% Refined Soluble Tapioca Flour, 0% Soluble Tapioca Flour Fiber Fraction | 96.25% Refined Soluble Tapioca Flour, 1.8% Soluble Tapioca Flour Fiber Fraction | 98.15% Refined Soluble Tapioca Flour, 3.75% Soluble Tapioca Flour Fiber Fraction | 96.25% Refined Soluble Tapioca Flour, 1.8% Milled Soluble Tapioca Flour Fiber Fraction | 94.39% Refined Soluble Tapioca Flour, 3.75% Milled Soluble Tapioca Flour Fiber Fraction | 94.39% Refined Soluble Tapioca Flour, 5.61% Milled Soluble Tapioca Flour Fiber Fraction | 71.88% Refined Soluble Tapioca Flour, 28.12% Milled Soluble Tapioca Flour Fiber Fraction |
|---|---|---|---|---|---|---|---|---|
| Apprearance & color | 5 | 3.3 | 2.9 | 3 | 3.5 | 3.6 | 3.1 | 2.38 |
| Overall aroma | 5 | 5 | 3.3 | 4.8 | 4.8 | 4.8 | 4.8 | 4.63 |
| Overall taste | 5 | 4.3 | 3.1 | 3.5 | 4.5 | 4.5 | 4.5 | 3.63 |
| Overall texture | 5 | 3.8 | 3.1 | 3.4 | 4.4 | 4.4 | 4 | 3.38 |
| Off-flavor | 5 | 4 | 3.6 | 4.6 | 4.9 | 4.9 | 4.9 | 3.38 |
| Overall flavor | 5 | 3.8 | 3.1 | 3.6 | 4.3 | 4.6 | 3.9 | 3.25 |
| Overall likeness | 5 | 4 | 3.1 | 3.4 | 4.3 | 4.6 | 4 | 2.88 |

Overall likenesses (how close the samples were to the maltodextrin control) of refined flour with addition of milled fibers 1.8%, 3.75% and 5.6% are above 4. The texture of prototypes containing milled fiber were generally greater those containing non-milled fiber, indicating that the size reduction of the coarse fiber fraction positively influenced texture and mouthfeel of the salad dressings.

Exemplary Aspects.

The following exemplary aspects are provided, the numbering of which is not to be construed as designating levels of importance:

Aspect 1 provides a reconstituted soluble tapioca flour composition, comprising a refined soluble tapioca flour and a soluble tapioca flour fiber fraction.

Aspect 2 provides the composition of Aspect 1, wherein the refined soluble tapioca flour is greater than 95 wt % but less than 100% of the composition.

Aspect 3 provides the composition of Aspect 1, wherein the refined soluble tapioca flour is greater than 90 wt % but less than 100%.

Aspect 4 provides the composition of Aspects 2 and 3, wherein the soluble tapioca flour fiber fraction is milled.

Aspect 8 provides the composition of Aspect 7, further comprising the refined soluble tapioca flour having a particle size distribution wherein 10% of particles have a size of 50 microns or less.

Aspect 9 provides a food product, comprising the reconstituted soluble tapioca flour composition of Aspect 1.

Aspect 10 provides the composition of Aspect 9, wherein the food product is a beverage mix, infant food, a medicinal product, an emulsion, convenience foods, salad dressings, or a snack-based filling.

Aspect 11 provides the composition of Aspect 9, wherein the reconstituted soluble tapioca flour composition is at least a partial replacement of maltodextrin.

Aspect 12 provides a use of the reconstituted soluble tapioca flour composition of Aspect 1 as a partial replacement of maltodextrin in a beverage mix, infant food, medicinal products, emulsions, convenience foods, salad dressings, or snack-based fillings or food products.

TABLE 3

| Sample Label | CHO | Protein | Fat | Soluble Fiber | Insoluble fiber | Sugar | Galactose | Fructose |
|---|---|---|---|---|---|---|---|---|
| King Lion Cassava Flour | 88.50% | 0.88% | <0.5% | 2.90% | 6.20% | 1.19% | <0.1% | 0.11% |
| Soluble tapioca flour | 94.70% | 0.82% | <0.5% | 2.20% | 3.00% | 3.32% | <0.1% | 0.39% |
| Soluble tapioca flour fiber fraction (>106 μm) by sieve | | | | 3.80% | 17.90% | | | |
| Refined soluble tapioca flour (<106 μm) by sieve | 95.40% | 0.79% | <0.5% | 1.50% | 2.10% | 2.70% | <0.1% | 0.33% |
| Soluble tapioca flour fiber fraction (using wet vacuum filtration) | | | | 5.50% | 25.40% | | | |
| Refined soluble tapioca flour (using wet vacuum filtration) | 93.40% | 0.79% | <0.5% | 0.50% | <0.1% | 3.56% | <0.1% | 0.19% |

| Sample Label | Glucose | Sucrose | Maltose | Lactose | Ash | Moisture | DE (Iodine-KI Method) |
|---|---|---|---|---|---|---|---|
| King Lion Cassava Flour | 0.20% | 0.89% | 0.89% | <0.1% | 0.72% | 9.93% | |
| Soluble tapioca flour | 0.70% | 0.54% | 1.70% | <0.1% | 0.87% | 3.60% | 13 |
| Soluble tapioca flour fiber fraction (>106 μm) by sieve | | | | | | 5.41% | |
| Refined soluble tapioca flour (<106 μm) by sieve | 0.60% | 0.48% | 1.29% | <0.1% | 0.16% | 3.34% | |
| Soluble tapioca flour fiber fraction (using wet vacuum filtration) | | | | | | 5.28% | |
| Refined soluble tapioca flour (using wet vacuum filtration) | 0.54% | 0.72% | 2.10% | <0.1% | 0.88% | 4.91% | |

The invention claimed is:

1. A reconstituted soluble tapioca flour comprising:
  (i) greater than 90 wt % to 98.15 wt % of a refined soluble tapioca flour, wherein the refined soluble tapioca flour has a particle size distribution after solubilization in 90° C. water wherein 90 % of particles have a size of 300 microns or less, 50% of particles have a particle size of 150 microns or less, and 10% of particles have a particle size of 40 microns or less based on wet/dispersed solubility in 90° C. water; and
  (ii) a milled fiber fraction of the soluble tapioca flour;
  wherein:
    a remaining balance of the reconstituted soluble tapioca flour being the milled fiber fraction of the soluble tapioca flour;
    the reconstituted soluble tapioca flour was first separated into a fiber fraction and the refined soluble tapioca flour, and secondly reconstituted by mixing the fiber fraction with the refined soluble tapioca flour; and
    the reconstituted soluble tapioca flour has a solubility of at least 5 wt % based on wet/dispersed solubility in 90° C. water.

2. The flour of claim 1, wherein the refined soluble tapioca flour is greater than 95 wt % to 98.15 wt % of the reconstituted soluble tapioca flour.

3. The flour of claim 1, wherein the milled fiber fraction of the soluble tapioca flour has a particle size distribution wherein 90% of particles have a size of 200 microns or less and 50% of particles have a particle size of 100 microns or less.

4. The flour of claim 3, further comprising the milled fiber fraction of the soluble tapioca flour having the particle size distribution wherein 10% of particles have a size of 50 microns or less.

5. A food product comprising the reconstituted soluble tapioca flour of claim 1.

6. The food product of claim 5, being a beverage mix, infant food, a medicinal product, an emulsion, convenience foods, salad dressings, or a snack-based filling.

7. The food product of claim 1, wherein the reconstituted soluble tapioca flour is at least a partial replacement of maltodextrin.

8. The food product of claim 7, wherein the reconstituted soluble tapioca flour is a full replacement of maltodextrin.

9. The flour of claim 1, wherein the solubility is at least 7 wt % based on wet/dispersed solubility in 90° C. water.

10. The flour of claim 1, wherein the solubility is at least 9 wt % based on wet/dispersed solubility in 90° C. water.

* * * * *